United States Patent
Lin et al.

(10) Patent No.: US 8,443,183 B2
(45) Date of Patent: May 14, 2013

(54) PRE-BOOT LOADER FOR REDUCING SYSTEM BOOT TIME

(75) Inventors: Wei-Nan Lin, Taipei (TW); Chia-Chen Wong, Taipei (TW); Jian-Jung Shiu, Taipei (TW); Philip Sheu, Saratoga, CA (US)

(73) Assignee: Spashtop Inc., San Jose, CA (US)

( * ) Notice: Subject to any disclaimer, the term of this patent is extended or adjusted under 35 U.S.C. 154(b) by 431 days.

(21) Appl. No.: 12/787,277

(22) Filed: May 25, 2010

(65) Prior Publication Data

US 2011/0055540 A1    Mar. 3, 2011

Related U.S. Application Data

(60) Provisional application No. 61/239,383, filed on Sep. 2, 2009.

(51) Int. Cl.
*G06F 15/177* (2006.01)
(52) U.S. Cl.
USPC .......... 713/2; 713/1; 710/8; 710/104
(58) Field of Classification Search .......... 713/1, 2, 713/100; 710/8, 104
See application file for complete search history.

(56) References Cited

U.S. PATENT DOCUMENTS

| | | | | |
|---|---|---|---|---|
| RE40,092 E * | 2/2008 | Kang | | 713/2 |
| 7,343,484 B2 * | 3/2008 | Du et al. | | 713/2 |
| 8,245,214 B2 * | 8/2012 | Long et al. | | 717/168 |
| 2006/0230262 A1 * | 10/2006 | Jansen et al. | | 713/2 |

* cited by examiner

*Primary Examiner* — Thuan Du
(74) *Attorney, Agent, or Firm* — Michael A. Glenn; Glenn Patent Group

(57) ABSTRACT

A pre-boot loader reduces the boot time of an operating system (OS). An OS is typically loaded by its own OS loader. A pre-boot loader is typically a software module in the system firmware or the pre-boot environment that loads the OS loader, which in turn loads the OS. In one embodiment, the pre-boot loader bypasses part or all of the steps performed by the OS loader, which shortens the loading time of the OS loader and the OS. In another embodiment, bypassing the steps of the OS loader reduces dependency on the system firmware functions. The system firmware takes advantage of this to further reduce boot time, by executing the pre-boot loader earlier instead of waiting until the full completion of system initialization by the system firmware.

12 Claims, 4 Drawing Sheets

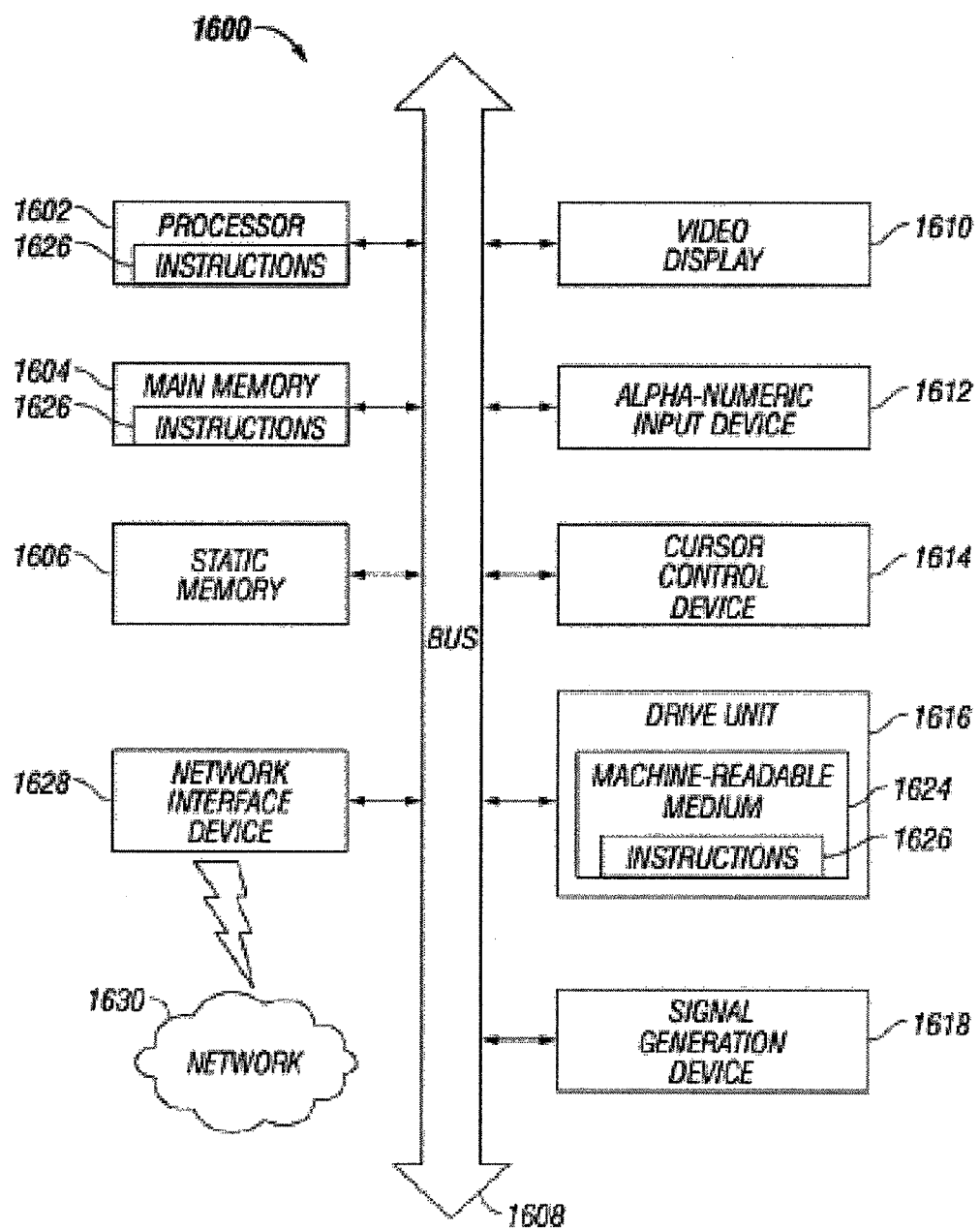

PRE-BOOT LOADER FOR REDUCING SYSTEM BOOT TIME

CROSS REFERENCE TO RELATED APPLICATIONS

This application claims priority to U.S. provisional patent application Ser. No. 61/239,383, filed Sep. 2, 2009, the entirety of which is incorporated herein by this reference thereto.

BACKGROUND OF THE INVENTION

1. Technical Field

The invention relates to computer operating systems. More particularly, the invention relates to a pre-boot loader for reducing system boot time.

2. Description of the Background Art

A computer's central processor can only execute program code found in Read-Only Memory (ROM) and Random Access Memory (RAM). Modern operating systems and application program code and data are stored on nonvolatile data storage devices, such as hard disk drives, CD, DVD, USB flash drive, and floppy disk. When a computer is first powered on, it does not have an operating system in ROM or RAM. The computer must initially execute a small program stored in ROM along with the bare minimum of data needed to access the nonvolatile devices from which the operating system programs and data are loaded into RAM.

The small program that starts this sequence of loading into RAM, i.e. the basic input/output system (BIOS), is also known as a bootstrap loader, bootstrap, or boot loader. This small boot loader program's only job is to load other data and programs which are then executed from RAM. Often, multiple-stage boot loaders are used, during which several programs of increasing complexity sequentially load one after the other in a process of chain loading.

Smaller computers often use less flexible but more automatic boot load mechanisms to ensure that the computer starts quickly and with a predetermined software configuration. In many desktop computers, for example, the bootstrapping process begins with the CPU executing software contained in ROM, for example, the BIOS of an IBM PC, at a predefined address. Some CPUs, including the Intel x86 series, are designed to execute this software after reset without outside help. This software contains rudimentary functionality to search for devices eligible to participate in booting, and load a small program from a special section (most commonly the boot sector) of the most promising device.

The boot device is the device from which the operating system is loaded. A modern PC BIOS supports booting from various devices, typically a local hard disk drive (or one of several partitions on such a disk), an optical disc drive, a USB device (flash drive, hard disk drive, optical disc drive, etc.), or a network interface card (using PXE). Older, less common bootable devices include floppy disk drives, SCSI devices, Zip drives, and LS-120 drives.

Typically, the BIOS allows the user to configure a boot order. If the boot order is set to "firstly, the DVD drive; secondly, the hard disk drive", then the BIOS tries to boot from the DVD drive, and if this fails, e.g. because there is no DVD in the drive, it tries to boot from the local hard drive.

For example, on a PC with Windows XP installed on the hard drive, the user could set the boot order to that given above, and then insert a GNU/Linux Live CD to try out Linux without having to install an operating system onto the hard drive. This is an example of dual booting—the user choosing which operating system to start after the computer has performed its Power On Self Test. In this example of dual booting, the user chooses by inserting or removing the CD from the computer, but it is more common to choose which operating system to boot by selecting from a menu using the computer keyboard.

Upon starting, a personal computer's x86 CPU runs the instruction located at the memory location CS:IP F000:FFF0 of the BIOS, which is located at the 0xFFFF0 address. This memory location is close to the end of the 1 MB of system memory accessible in real mode. It typically contains a jump instruction that transfers execution to the location of the BIOS start-up program. This program runs a power-on self test (POST) to check and initialize required devices. The BIOS goes through a pre-configured list of non-volatile storage devices ("boot device sequence") until it finds one that is bootable. A bootable device is defined as one that can be read from, and the last two bytes of the first sector contain the word 0xAA55 (also known as the boot signature).

Once the BIOS has found a bootable device it loads the boot sector to hexadecimal Segment:Offset address 0000:7C00 or 07C0:0000 (maps to the same ultimate address) and transfers execution to the boot code. In the case of a hard disk, this is referred to as the master boot record (MBR) and is often not operating system specific. The conventional MBR code checks the MBR's partition table for a partition set as bootable (the one with active flag set). If an active partition is found, the MBR code loads the boot sector code from that partition and executes it. The boot sector is often operating-system-specific; however, in most operating systems its main function is to load and execute the operating system kernel, which continues startup. If there is no active partition, or the active partition's boot sector is invalid, the MBR may load a secondary boot loader which selects a partition (often via user input) and loads its boot sector, which usually loads the corresponding operating system kernel.

It is recognized that the boot process is time consuming. Thus, a user must wait for this process to complete, i.e. the computer's operating system (OS) is booted and running, before he can use the computer that is being booted.

SUMMARY OF THE INVENTION

An embodiment of the invention comprises a pre-boot loader that reduces the boot time of an operating system (OS). An OS is typically loaded by its own OS loader. A pre-boot loader is typically a software module in the pre-boot environment that loads the OS loader, which in turn loads the OS.

In one embodiment, the pre-boot loader bypasses part or all of the steps performed by the OS loader, which shortens the loading time of the OS loader and the OS.

In another embodiment, bypassing the steps of the OS loader reduces dependency on the system firmware functions. The system firmware takes advantage of this to reduce boot time further by skipping some of its normal initialization steps and executing the pre-boot loader earlier.

BRIEF DESCRIPTION OF THE DRAWINGS

FIG. 4 is a block schematic diagram of a machine in the exemplary form of a computer system within which a set of instructions for causing the machine to implement a pre-boot loader for reducing system boot time according to the invention.

DETAILED DESCRIPTION OF THE INVENTION

The invention comprises a pre-boot loader that reduces the boot time of an operating system (OS).

Normal Boot Process

Figure 1:
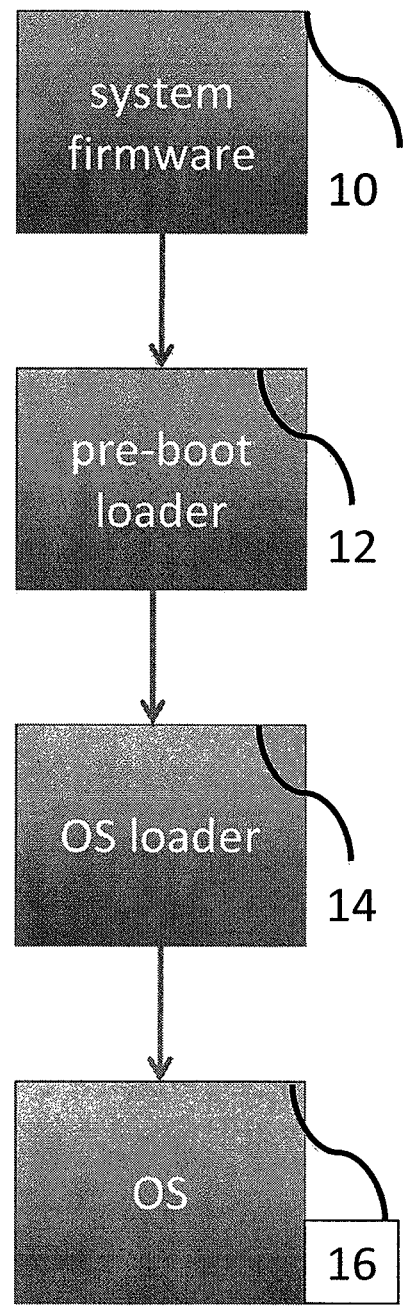
FIG. 1 is a flow diagram that illustrates the booting process of a typical computer.

FIG. 1 is a flow diagram that illustrates the booting process of a typical computer. System firmware 10 is the first code to execute when a computer is powered on. It is responsible for fully initializing the computer hardware. The final module in the system firmware to run is a pre-boot loader 12. For most systems, the system firmware is a BIOS, and the pre-boot loader is a software module within the BIOS referred to as INT 19h. For newer systems, the system firmware is a UEFI (Unified Extensible Firmware Interface), and the pre-boot loader is a software module within the UEFI referred to as the BDS (boot device selector). The pre-boot loader is responsible for finding and launching the OS loader 14. In one embodiment, the pre-boot loader presents a user interface for the user to specify which OS or application to launch. The OS loader performs a number of steps to prepare the system to load a particular OS. When the OS loader completes, it launches the OS 16.

Boot Process with Shortened OS Loader

Figure 2:
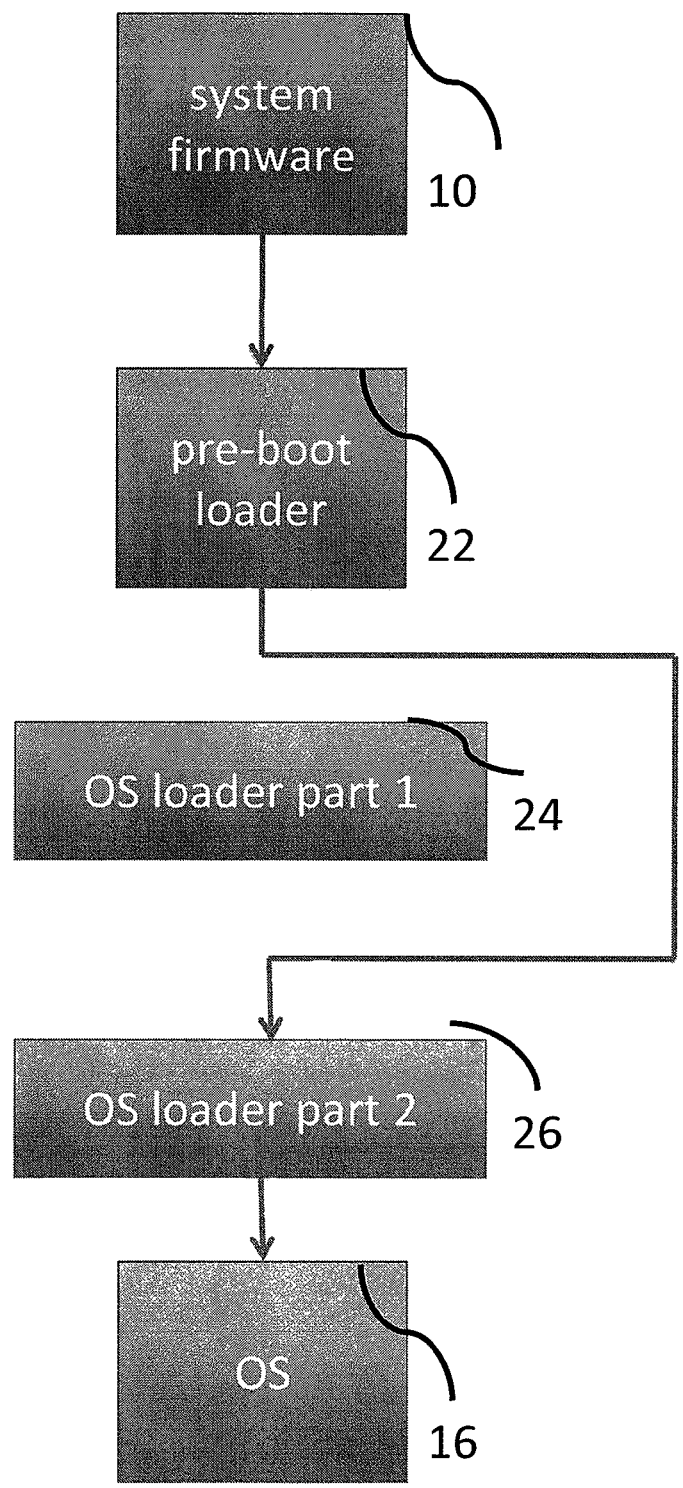
FIG. 2 is a flow diagram that illustrates a special pre-boot loader that bypasses part of the steps performed by the OS loader according to the invention.

FIG. 2 is a flow diagram that illustrates a special pre-boot loader that bypasses part of the steps performed by the OS loader according to the invention. The pre-boot loader 22 can make part or all of the OS loader unnecessary by performing the roles of the OS loader. Given pre-boot loader's and system firmware's 20 precise knowledge of the actual hardware platform, it is possible for the pre-boot loader to perform the roles of the OS loader in a faster and more efficient fashion.

In the case of the Linux OS, the OS loader is referred to as bootsect. The bootsect can be bypassed entirely with a special pre-boot loader. In one embodiment, the pre-boot loader is an embedded OS that is launched by system firmware. One such implementation of an intelligent pre-boot loader is the Splashtop core engine, which is a small embedded OS that is used to improve boot times on PCs. The Splashtop core engine can perform of the functions of the OS loader bootsect and can boot the Linux OS directly without having to execute bootsect. In other embodiments, the intelligent pre-boot loader can be part of the system firmware (BIOS or UEFI). The pre-boot loader built into system firmware can be enhanced to make bootsect unnecessary by preparing the data structures needed for Linux OS to boot, switching CPU modes, etc. The pre-boot loader then bypasses bootsect by setting code execution to start at 0x100000, which is the starting address of Linux OS itself.

In FIG. 2, OS loader part 1 (24) represents the portion of OS loader that is made unnecessary by the special pre-boot loader. This can be the portion of OS loader that gathers various hardware information, switches CPU modes, etc. The pre-boot loader can then bypass the portion of OS loader that is now unnecessary. It can do so by setting the execution address of the OS loader at the portion of OS loader 26 that is still necessary.

In the case where the entire OS loader can be bypassed, the OS loader part 1 represents the entire OS loader, and the OS loader part 2 does not exist. Where the OS is Linux, it has been shown that the entire OS loader (bootsect) can be bypassed. In this case, the pre-boot loader launches the OS directly. The pre-boot loader does this by setting the CPU's execution address at the starting address of the Linux OS, which is typically 0x100000.

Boot Process with Shortened OS Loader and Shortened System Firmware

Figure 3:
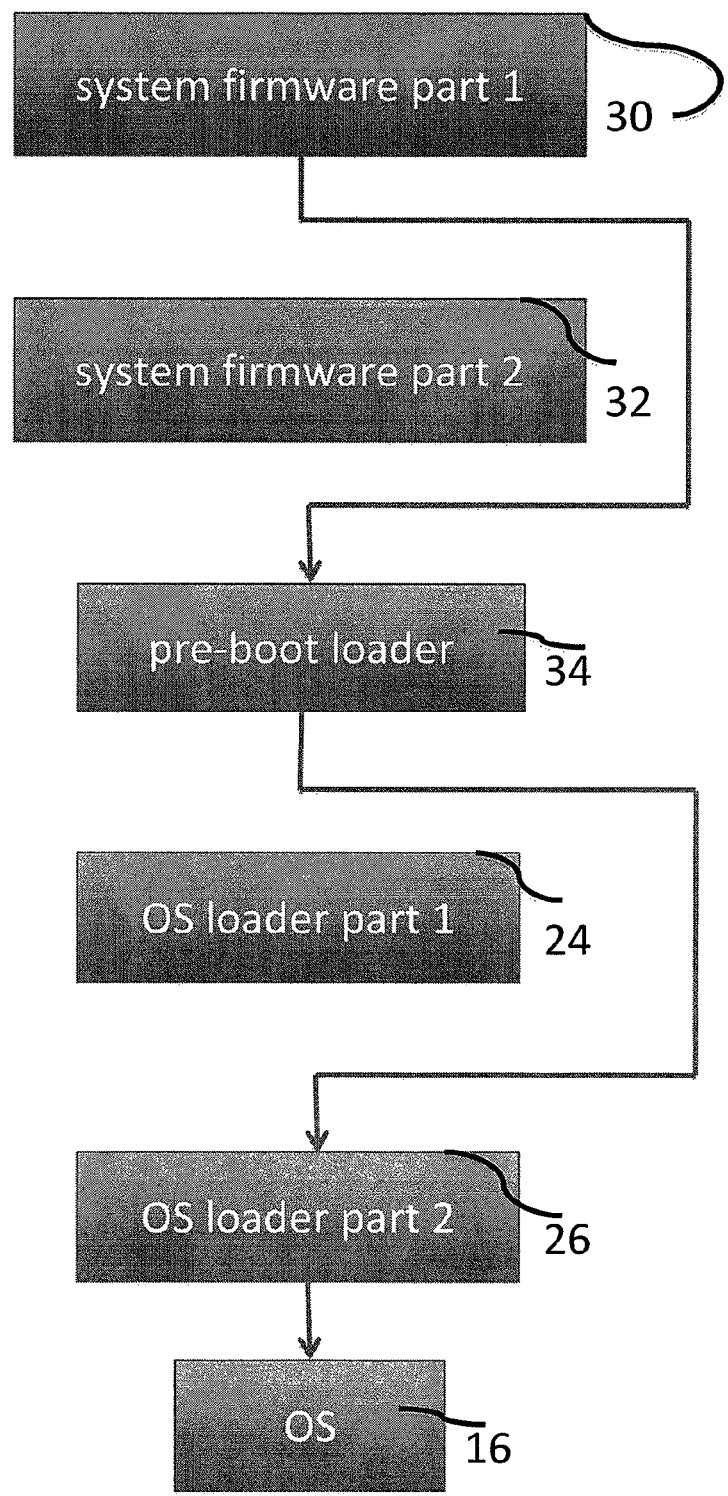
FIG. 3 is a flow diagram that illustrates a special pre-boot loader that bypasses part of the steps performed by the OS loader and a special system firmware that only runs partially before launching the pre-boot loader according to the invention.

FIG. 3 is a flow diagram that illustrates a special pre-boot loader that bypasses part of the steps performed by the OS loader and a special system firmware that only runs partially before launching the pre-boot loader according to the invention. One such example is booting a Linux OS and using the Splashtop core engine as the pre-boot loader. The Splashtop core engine can skip over the OS loader for Linux (bootsect) entirely and directly launch Linux. Because the system firmware no longer needs to provide the functions used by bootsect, the system firmware can shorten its boot process and launch the Splashtop core engine earlier. System firmware no longer needs to spend time initializing and providing functions such as interrupt service routines, CPU mode switching routines, driver modules, etc.

As discussed above, the pre-boot loader can bypass part or all of the steps performed by the OS loader, thus shortening the overall boot time. In one embodiment, the steps that are bypassed comprise communication between the OS loader and system firmware to query platform information. One example of such platform information comprises the boot parameters needed by Linux to boot. Below is a partial list of such boot parameters. These boot parameters can instead be provided by the pre-boot loader.

Boot_params.Srceen_info.orig_video_isVGA
    Boot_params.Srceen_info.lfb_width
    Boot_params.Srceen_info.lfb_height
    Boot_params.Srceen_info.lfb_depth
    Boot_params.Srceen_info.lfb_linelength
    Boot_params.Srceen_info.pages
    Boot_params.Srceen_info.lfb_base
    Boot_params.Srceen_info.red_size
    Boot_params.Srceen_info.red_pos
    Boot_params.Srceen_info.green_size
    Boot_params.Srceen_info.green_pos
    Boot_params.Srceen_info.blue_size
    Boot_params.Srceen_info.blue_pos
    Boot_params.alt_mem_k
    Boot_params.hdr.type_of_loader
    Boot_params.hdr.loadflags
    Boot_params.hdr.vid_mode
    Boot_params.hdr.ramdisk_image
    Boot_params.hdr.ramdisk_size
    Boot_params.hdr.heap_end_ptr
    Boot_params.hdr.cmd_line_ptr In the case where these steps in the OS loader are bypassed, system firmware can reduce the amount of functionality it provides. System firmware no longer needs to provide the software routines to be used by OS loader to obtain the boot parameters. The portion of system firmware that is no longer needed is represented by system firmware part 2 (32) in FIG. 3. Thus, the system firmware 30 only executes its needed functions, represented by system firmware part 1 in FIG. 3. The unneeded functions are bypassed. As a result the pre-boot loader can be launched earlier. The overall boot time is further reduced. On a desktop motherboard system, reduction can be as much as half of the typical system firmware boot time, or a reduction of 5 to 10 seconds.

Computer Implementation

FIG. 4 is a block schematic diagram of a machine in the exemplary form of a computer system 1600 within which a set of instructions for causing the machine to implement a pre-boot loader for reducing system boot time. In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with complementary metal oxide semiconductor (CMOS), transistor-transistor logic (TTL), very large systems integration (VLSI), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system, comprising:
    a processor coupled to a plurality of memory devices;
    system firmware stored in a first memory device of the plurality of memory devices for initializing system hardware;
    an operating system stored in a second memory device of the plurality of memory devices;
    an operating system (OS) loader for launching an OS; and
    a pre-boot loader, operatively coupled between said system firmware and said OS loader, said pre-boot loader configured to reduce system boot time by bypassing at least some of said system firmware function;
    wherein the pre-boot loader, the OS loader, and the operating system each comprise a separate computer program;
    wherein a portion of the system firmware loads instructions for the pre-boot loader into a third memory device of the plurality of memory devices and transfers execution to a first instruction within the instructions for the pre-boot loader;
    wherein a portion of the pre-boot loader loads instructions for the OS loader into the third memory device and transfers execution to a second instruction within the instructions for the OS loader;
    wherein a portion of the OS loader loads instructions for the operating system into the third memory device and transfer execution to a third instruction within the instructions for the operating system.

2. The system of claim 1, wherein said pre-boot loader is configured such that the portion of said system firmware that provides functions used by said OS loader, including any of interrupt service routines, CPU mode switching routines, and driver modules, can be bypassed.

3. A method for booting an operating system, the method comprising:
    storing system firmware that is partitioned into a first portion and a second portion;
    storing an operating system (OS) loader that is partitioned into a first portion and a second portion;
    executing the first portion of system firmware, and bypassing execution of the second portion of system firmware;
    launching by the first portion of system firmware a pre-boot loader;
    wherein the second portion of system firmware comprises routines that are made unnecessary by the pre-boot loader;
    wherein the pre-boot loader makes unnecessary the routines comprising the second portion of system firmware by:
        performing functionality equivalent to the functionality provided by the routines comprising the second portion of system firmware; or
        changing the boot flow such that the functionality provided by the routines comprising the second portion of system firmware are never needed during the remainder of the boot process;
    launching by the pre-boot loader the second portion of the OS loader;
    wherein the first portion of the OS loader includes instructions that are made unnecessary by the pre-boot loader;
    wherein the pre-boot loader makes unnecessary the instructions included in the first portion of OS loader by:
        performing functionality equivalent to the functionality provided by the instructions included in the first portion of OS loader; or
        changing the boot flow such that the functionality provided by the instructions included in the first portion of OS loader are never needed during the boot process; and launching the OS by the second portion of the OS loader.

4. The method of claim 3, wherein:
the routines comprising the second portion of the system firmware provides functionality for at least one of:
interrupt service routines;
CPU mode switching;
gathering hardware information;
device drivers; or querying for boot parameters.

5. The method of claim 3, wherein the pre-boot loader obtains boot parameter values by using pre-determined values rather than calling system firmware functions.

6. The method of claim 5, wherein the pre-determined values are retrieved from non-volatile storage.

7. The method of claim 3, wherein the instructions included in the first portion of the OS loader calls routines that provide functionality for at least one of:
interrupt service routines;
CPU mode switching;
gathering hardware information;
device drivers; or querying for boot parameters.

8. A system comprising:
a processor coupled to a memory device;
system firmware that is partitioned into a first portion and a second portion;
an operating system (OS);
an operating system (OS) loader for loading and launching the OS, the OS loader partitioned into a first portion and a second portion; and
a pre-boot loader;
wherein the processor executes the first portion of system firmware, and bypasses execution of the second portion of system firmware;
wherein executing the first portion of system firmware causes the processor to load and execute the pre-boot loader;
wherein the second portion of system firmware comprises routines that are made unnecessary by the pre-boot loader by:
performing functionality equivalent to the functionality provided by the routines comprising the second portion of system firmware; or
changing the boot flow such that the functionality provided by the routines comprising the second portion of system firmware are never needed during the remainder of the boot process;
wherein executing the pre-boot loader causes the processor to bypass the first portion of the OS loader and load and execute the second portion of the OS loader;
wherein the first portion of the OS loader includes instructions that are made unnecessary by the pre-boot loader;
wherein the pre-boot loader makes unnecessary the instructions included in the first portion of OS loader by:
performing functionality equivalent to the functionality provided by the instructions included in the first portion of OS loader; or
changing the boot flow such that the functionality provided by the instructions included in the first portion of OS loader are never needed during the boot process; and
wherein executing the second portion of the OS loader causes the processor to load and execute the OS.

9. The system of claim 8, wherein:
the routines comprising the second portion of the system firmware provides functionality for at least one of:
interrupt service routines;
CPU mode switching;
gathering hardware information;
device drivers; or querying for boot parameters.

10. The system of claim 8, wherein the pre-boot loader obtains boot parameter values by using pre-determined values rather than calling system firmware functions.

11. The system of claim 10, wherein the pre-determined values are retrieved from non-volatile storage.

12. The system of claim 10, wherein the instructions included in the first portion of the OS loader calls routines that provide functionality for at least one of:
interrupt service routines;
CPU mode switching;
gathering hardware information;
device drivers; or querying for boot parameters.

* * * * *

UNITED STATES PATENT AND TRADEMARK OFFICE
CERTIFICATE OF CORRECTION

PATENT NO. : 8,443,183 B2
APPLICATION NO. : 12/787277
DATED : May 14, 2013
INVENTOR(S) : Lin et al.

Page 1 of 1

It is certified that error appears in the above-identified patent and that said Letters Patent is hereby corrected as shown below:

On the Title Page, item (73), under "Assignee", in Column 1, Line 1, delete "Spashtop Inc." and insert -- Splashtop Inc. --, therefor.

Signed and Sealed this
Twelfth Day of November, 2013

Teresa Stanek Rea
*Deputy Director of the United States Patent and Trademark Office*